F. H. NIEMANN.
Combined Step-Covers and Wheel-Fenders.

No. 139,602. Patented June 3, 1873.

WITNESSES
Aaron A. Ferris
Milton Sater

INVENTOR.
Francis Henry Niemann

UNITED STATES PATENT OFFICE.

FRANCIS H. NIEMANN, OF CINCINNATI, OHIO.

IMPROVEMENT IN COMBINED STEP-COVERS AND WHEEL-FENDERS.

Specification forming part of Letters Patent No. 139,602, dated June 3, 1873; application filed August 28, 1872.

*To all whom it may concern:*

Be it known that I, FRANCIS HENRY NIEMANN, of Cincinnati, in the county of Hamilton and State of Ohio, have invented a Flexible Step-Cover and Wheel-Fender, of which the following is a specification:

My invention relates to the working of a step-fender in carriages by means of a spring, and in protecting the surface of the fe d ·r, when the door is open, from being scratched by the wheel, by means of a diamond-shaped <> head-bolt, which, at the same time, fastens the lower end of the spring to the fender.

Figure 1 of the drawing represents the door and fender when open and resting against the rim of the hind wheel. $f$ is the door; $d$, the point at which the spring is fastened to the door with rivets. $a$ is the spring which connects with the fender at the point $c$. $b$ is the fender, which is fastened to the door of the carriage by hinges. $e$ is the hind wheel of the carriage.

Figure 2 gives the side view of the step, taken from the front of the carriage when the door is closed and the fender covers the step. $g$ is the step proper. $i$ is the bottom of the carriage.

Figure 1:
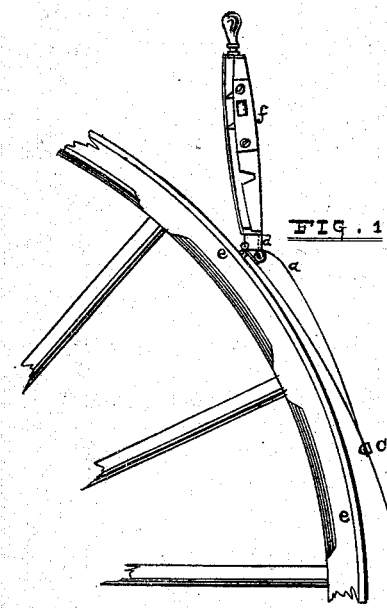
Figure 2:
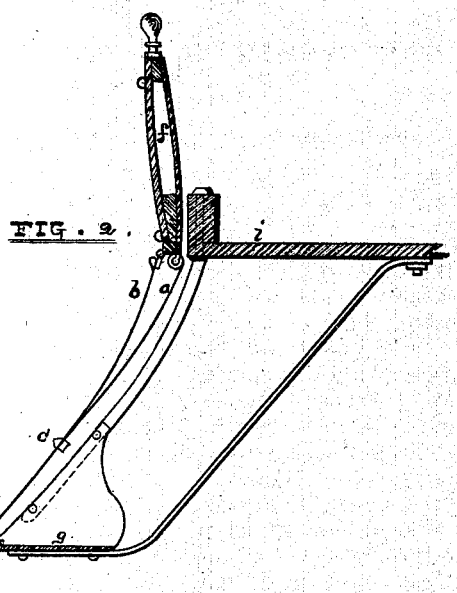
Figure 4:
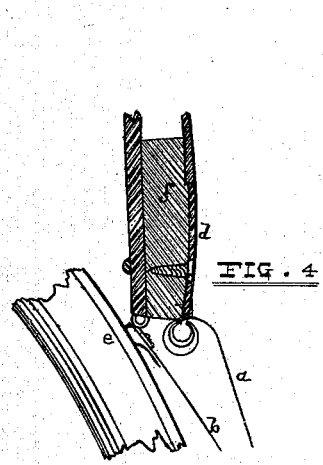
Fig. 4 shows how the fender touches the wheel.
Figure 3:
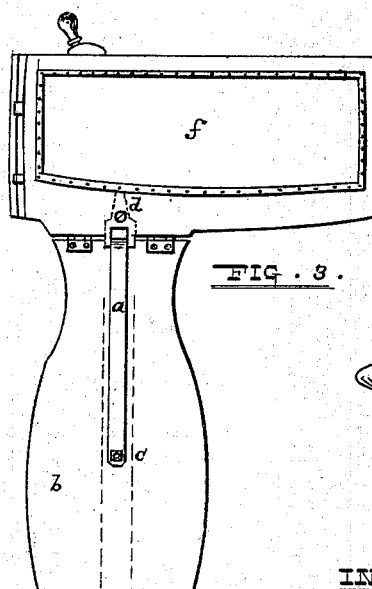
Fig. 3 shows the inside of the carriage-door with fender and spring attached, the door being open.
Figure 5:
Fig. 5 shows the diamond <> head-bolt which fastens spring and fender together, and also protects the outside surface of the fender from becoming scratched or bruised by the wheel, in case of pressure against the fender from the inside when the door of the carriage is open. $c$ is the diamond <> head-bolt, and $h$ a piece to leather, upon which it is fastened down.

The advantages of our step-cover and wheel-fender are the following: The fender when shut falls gracefully over the step, and, the spring bearing it down, produces no strain upon the lower part of the door, as other step-covers do. The spring, when the door is open, also keeps the fender in position over the rim of the wheel; while, when the door is shut, it holds the fender firmly to the step and thus prevents rattling. The fender, when open, does not touch the wheel; and in case of any pressure on it in that position from the inside, the diamond <> head-bolt touches the wheel first, supports the fender against the wheel, and at the same time prevents the scratching of the fender.

I claim—

1. The spring $a$, in combination with the fender $b$, as a cover for the step $g$, and a fender for the wheel $e$, substantially as set forth.

2. The combination of the spring $a$, the fender $b$, and the door $f$, substantially as set forth, and for the purpose specified.

3. The spring $a$, in combination with the fender $b$ and the door $f$, to which it is fastened at the point $d$ as a cover for the step $g$ and a fender for the wheel $e$, substantially as set forth.

4. The combination of the spring $a$, the knob $c$, and fender $b$, substantially as set forth, and for the purpose mentioned.

FRANCIS HENRY NIEMANN.

Witnesses:
 FERDINAND VOGELER,
 F. C. ALBRECHT.